United States Patent Office 3,555,014

Patented Jan. 12, 1971

3,555,014

METHOD FOR PREPARING BENZODIAZEPINE DERIVATIVES

Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, and Tsuyoshi Kobayashi, Minoo-shi, Japan, assignors to Sumitomo Chemical Company, Ltd., Osaka, Japan, a corporation of Japan No Drawing. Filed Apr. 16, 1969, Ser. No. 816,827
Claims priority, application Japan, Apr. 26, 1968, 43/28,189
Int. Cl. C07d *53/06*
U.S. Cl. 260—239.3 5 Claims

ABSTRACT OF THE DISCLOSURE

Benzodiazepine derivatives having prominent effects as tranquilizers, musculorelaxants, antispasmodics and hypnotics and represented by the formula,

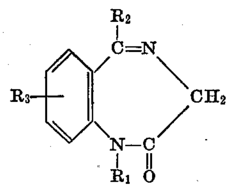

wherein $R_1$ is a lower alkanoyl amino group or a benzoyl amino group; $R_2$ is a phenyl group, a pyridyl group, or a halogen- or trifluoro-methyl-substituted phenyl group; and $R_3$ is a hydrogen atom, a halogen atom or a trifluoromethyl group, are produced by reacting a 2-aminomethyl-indole derivative represented by the formula,

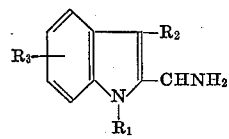

wherein $R_1$, $R_2$ and $R_3$ are as defined above, with an oxidizing agent.

This invention relates to a novel process for producing 1-substituted benzodiazepine derivatives. More particularly, the invention pertains to a novel process for preparing 1-substituted benzodiazepine derivatives, and salts thereof, represented by the general formula (I),

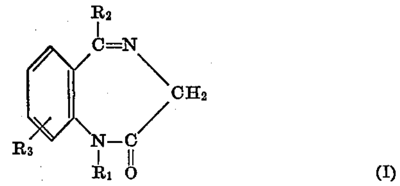

wherein $R_1$ signifies a lower alkanoyl amino group or a benzoyl amino group; $R_2$ signifies a phenyl group, a pyridyl group, or a halogen- or trifluoromethyl-substituted phenyl group; and $R_3$ signifies a hydrogen atom, a halogen atom or a trifluoromethyl group.

In the compound represented by the aforesaid Formula I, the halogen atom includes chlorine, bromine, iodine, and fluorine atoms; and a lower alkanoyl amino group includes acetylamino group, propionylamino group, butyroylamino group and isobutyroylamino group.

The present invention is concerned with a process for producing 1-substituted-benzodiazepine derivatives, and salts thereof, represented by the aforesaid Formula I by treating with a suitable oxidizing agent a 1-substituted 2-aminomethyl-indole derivative, or a salt thereof, represented by the Formula II,

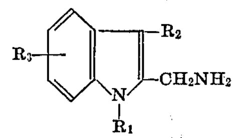

wherein $R_1$, $R_2$ and $R_3$ are as defined in the Formula I.

The 1-substituted-benzodiazepine derivatives represented by the Formula I have prominent effects as tranquilizers, musculorelaxants, antispasmodics and hypnotics, and are of great importance as medicines.

A few processes for producing these benzodiazepine derivatives have heretofore been described. For instance, it is known to obtain the 1-substituted benzodiazepine derivatives by contacting 1-amino-1,3-dihydro-2H-1,4-benzodiazepine-2-one with acyl halide (Japanese patent publication No. 6,055/1968).

Contrary to these procedures, we have found, unexpectedly, that benzodiazepine derivatives of the Formula I can be smoothly and economically prepared in high yields and of high purity by reacting a 2-aminomethyl-indole derivative having the Formula II, or a salt thereof, with an appropriate oxidizing agent. Such a process for converting a 5-membered ring compound into a 7-membered ring compound by ring expansion reaction has not heretofore been described or suggested in the literature. This new and useful process thus differs markedly from the known methods and represents an improvement thereover.

The 2-aminomethyl-indole derivatives of the Formula II which are employed in the present invention are novel compounds. They can be easily prepared by reacting an indole-2-carbonitrile derivative produced by a process similar to that disclosed in our co-pending U.S. patent application Ser. No. 725,195, filed Apr. 29, 1968, and represented by the formula,

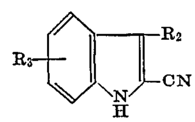

wherein $R_2$ and $R_3$ are as defined above, with chloroamine and then acylating the resulting 1-amino-indole-2-carbonitrile derivative, and reducing the obtained 1-acylamino-indole-2-carbonitrile derivative represented by the formula,

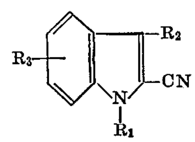

wherein $R_1$, $R_2$ and $R_3$ are as defined above, in the presence of a Raney nickel catalyst.

An object of the present invention is to provide a novel and economically advantageous process for producing benzodiazepine derivatives and their salts.

Other objects of the invention will become apparent from the description that follows.

In order to achieve the above objects, the present invention provides a process for preparing benzodiazepine derivatives represented by the Formula I which comprises reacting a 2-aminomethylindole derivative represented by the Formula II, or a salt thereof, with an oxidizing agent.

The processes of the present invention are carried out through a ring expansion reaction from indole rings to benzodiazepine rings. Such reaction is novel and has not heretofore been described in any literature.

In preparing the benzodiazepine derivatives according to this invention, 2-aminomethylindole derivatives represented by the Formula II, or salts thereof, are reacted with an appropriate oxidizing agent. Examples of the salts include hydrochloride, hydrobromide, sulfate or phosphate. The oxidizing agent for this process includes, for example, ozone, hydrogen peroxide, peracide (e.g. performic, peracetic and perbenzoic acids), chromic acid, potassium permanganate, and manganese dioxide, but is not limited to the named compounds. Generally, the reaction progresses readily at room temperature, but the temperature may be higher or lower as necessary to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, acetic acid, sulfuric acid and the like. The oxidizing agent is used in the stiochiometric amount or more. The reaction temperature varies depending on the oxidizing agent employed.

Where the oxidation is carried out by use of chromic acid in the presence of acetic acid, it is preferable that the chromic acid may be used in 2–3 times the equimolar amount and the reaction may be carried out at room temperature. A 2-aminomethylindole derivative is dissolved or suspended in the solvent and the oxidizing agent is added to the solution or suspension with stirring. Generally, the reaction terminates within about 24 hours.

Where the oxidation is carried out by use of ozone, the reaction is preferably carried out at room temperature. A 2-aminomethylindole derivative is dissolved or suspended in the solvent such as formic acid, acetic acid, carbon tetrachloride or the like and ozonized oxygen is bubbled into the solution or suspension with stirring.

The desired benzodiazepine derivative can be separated from the reaction mixture in a crude form by extraction, with or without prior neutralization, and by evaporation to dryness. The product is further purified, if desired, by recrystallization from a suitable solvent such as ethanol, isopropanol or the like in a standard manner.

The 1-substituted-benodiazepine derivative obtained according to the above-mentioned process may also be isolated in the form of an acid addition salt by treatment with an acid, e.g. a mineral acid such as hydrochloric, sulfuric, nitric, phosphoric or chromic acid, or an organic acid such as maleic, fumaric, succinic, formic or acetic acid.

According to the process of the present invention, there are produced such benzodiazepine derivatives and acid addition salts thereof as shown below.

1-acetamido-5-phenyl-1,3-dihydro-2H-1,4-benzodiazepine-2-one.
1-acetamido-5-phenyl-7-chloro-1,3-dihydro-2H-1,4-benzodiazepine-2-one.
1-acetamido-5-phenyl-7-bromo-1,3-dihydro-2H-1,4-benzodiazepine-2-one.
1-acetamido-5-phenyl-7-trifluoromethyl-1,3-dihydro-2H-1,4-benzodiazepine-2-one.
1-acetamido-5-phenyl-6-(or 8) chloro-1,3-dihydro-2H-1,4-benzodiazepine-2-one.
1-acetamido-5-(o-chlorophenyl)-7-chloro-1,3-dihydro-2H-1,4-benzodiazepine-2-one.
1-acetamido-5-(o-fluorophenyl)-7-chloro-1,3-dihydro-2H-1,4-benzodiazepine-2-one.
1-propronylamido-5-phenyl-7-chloro-1,3-dihydro-2H-1,4-benzodiazepine-2-one.
1-acetamido-5-(2′-pyridyl)-7-chloro1,3-dihydro-2H-1,4-benzodiazepine-2-one.
1-acetamido-5-(2′-pyridyl)-7-bromo-1,3-dihydro-2H-1,4-benzodiazepine-2-one.
1-acetamido-5-(o-trifluoromethylphenyl)-7-chloro-1,3-dihydro-2H-1,4-benzodiazepine-2-one.

This invention is further disclosed in the following example of preferred embodiments thereof, which are present for purposes of illustration and are not intended to limit the scope of the invention.

EXAMPLE

A solution of 3 g. of chromic anhydride in 3 ml. of water is added dropwise to a mixture of 3.4 g. of 1-acetamido - 2 - aminomethyl - 3 - (o - chlorophenyl) - 5 - chloroindole and 40 ml. of glacial acetic acid below 20° C. After completion of the addition, the mixture is stirred overnight. Thereafter, the reaction mixture is poured into water, and then made alkaline with aqueous ammonia solution, and extracted with ether. The etheral layer is washed with water, dried over anhydrous sodium sulfate and concentrated under reduced pressure to an oily residue, which is crystallized from ether to give 1-acetamido-5 - (o - chlorophenyl) - 7 - chloro - 1,3 - dihydro - 2H-1,4-benzodiazepine-2-one having a melting point of 222°–224° C.

Similary, using the procedure in example, but replacing 1 - acetamido - 2 - aminomethyl-3-(o-chlorophenyl)-5-chloroindole employed as the starting material in example by 1-acetamido-2-aminomethyl-3-phenyl-5-chloroindole, 1 - propionylamido-2-aminomethyl-3-phenyl-5-chloroindole, and 1-acetamido-2-aminomethyl-3-phenyl-5-trifluoromethylindole, there are obtained 1-acetamido-5-phenyl - 7 - chloro - 1,3 - dihydro - 2H - 1,4 - benzodiazepine-2-one, 1-propionylamido-5-phenyl-7-chloro-1,3-dihydro-2H-1,4-benzodiazepine-2-one and 1 - acetamido - 5-phenyl - 7 - trifluoromethyl - 1,3 - dihydro - 2H - 1,4 - benzodiazepine-2-one respectively.

What is claimed is:

1. A process for preparing 1-substituted benzodiazepine derivatives, and acid addition salts thereof, represented by the formula,

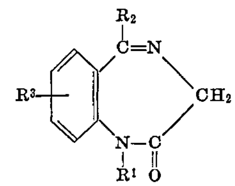

wherein $R_1$ signifies a lower alkanoyl amino group or a benzoyl amino group; $R_2$ signifies a phenyl group, a pyridyl group, or a halogen- trifluoromethyl-substituted phenyl group; $R_3$ signifies a hydrogen atom, a halogen atom or a trifluoromethyl group, which process comprises contacting a 1-substituted aminomethylindole derivative, or an acid addition salt thereof, represented by the formula,

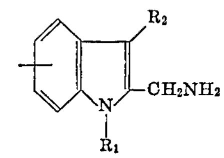

wherein $R_1$, $R_2$ and $R_3$ are as defined above, with at least the stoichiometric amount of an oxidizing agent selected from the group consisting of ozone, hydrogen peroxide, performic acid, peracetic acid, perbenzoic acid, chromic acid, potassium permanganate and manganese dioxide, in the presence of a solvent.

2. A process according to claim 1, wherein the oxidizing agent is chromic anhydride and the reaction is carried out at a room temperature.

3. A process according to claim 1, wherein the solvent is water, acetone, carbon tetrachloride, formic acid, acetic acid or sulfuric acid.

4. A process according to claim 1, wherein the acid in the acid addition salt of said benzodiazepine derivative is hydrochloric acid, sulfuric acid, nitric acid, phosphoric acid, chromic acid, maleic acid, fumaric acid, succinic acid, formic acid or acetic acid.

5. A process according to claim 1, wherein the acid in the acid addition salt of said 1-substituted aminomethylindole derivatives is hydrochloric acid, hydrobromic acid, sulfuric acid or phosphoric acid.

References Cited

UNITED STATES PATENTS 3,371,085 2/1968 Reeder et al. -------- 260—239.3

HENRY R. JILES, Primary Examiner

R. T. BOND, Assistant Examiner

U.S. Cl. X.R.

260—326.15